United States Patent [19]
Tucker

[11] Patent Number: 5,402,273
[45] Date of Patent: Mar. 28, 1995

[54] CIRCUIT FOR DETERMINING WINDOW MARGIN FOR DATA TRANSITIONS IN A STREAMING DATA DEVICE

[75] Inventor: Lawrence J. Tucker, Whitmore Lake, Mich.

[73] Assignee: Conner Peripherals, Inc., San Jose, Calif.

[21] Appl. No.: 955,103

[22] Filed: Oct. 1, 1992

[51] Int. Cl.$^6$ ............................................. G11B 5/09
[52] U.S. Cl. ...................................................... 360/51
[58] Field of Search ................................... 360/46, 51

[56] References Cited

U.S. PATENT DOCUMENTS

| | | | |
|---|---|---|---|
| 4,809,088 | 2/1989 | Lofgren et al. | 360/51 |
| 5,003,408 | 3/1991 | Farkas et al. | 360/51 |
| 5,109,304 | 4/1992 | Pederson | 360/51 |
| 5,146,372 | 9/1992 | Cronch et al. | 360/51 |
| 5,187,615 | 2/1993 | Miyazawa et al. | 360/51 |

OTHER PUBLICATIONS

Mackintosh, Nigel D. *A Margin Analyser for Disk and Tape Drives*, IEEE Transactions on Magnetics, vol. MAG-17, No. 6, Nov. 1981.

International Disk Equipment and Materials Association (IDEMA), Doc. No. T11-91, revision 1, Aug. 23, 1989.

MackinTosh, Nigel D. *Evaluation of Disk Drives by Margin Analysis*, Century Data Systems, International Peripherals and Software Exposition, Oct. 1, 1982.

Lerma, Jesse, *Correlation of Bit Shift, Margin and Error Rate*, Applied Data Communications, ANSI X357.1.1 Aug. 5, 1986.

Baldwin, Dale, *Disk Drive Analyzer Speeds Testing with Innovative Graphics*, Electronic Design, May 16, 1985.

Juliff, Michael F., *Testing Winchester Disk Drives*, Mini/Micro Systems, Feb. 1983.

*Primary Examiner*—Donal33021 Hajec
*Assistant Examiner*—Won Tae C. Kim
*Attorney, Agent, or Firm*—Fliesler, Dubb, Meyer & Lovejoy

[57] ABSTRACT

This invention is directed to a method and a circuit for determining a relative phase shift between a data transition and a data separator window which are used to decode data read back from a mass storage device. The data separator windows provide a time interval in which a data transition must occur in order to be properly interpreted. This is accomplished by delaying the occurrence of the data transition, thereby shifting it toward the trailing edge of the data separator window, to determine if the delayed data transition occurs late within the data separator window. At the same time, the occurrence of the data separator window is delayed, thereby shifting the leading edge of the data separator window toward the data transition, to determine if the data transition occurs late within the data separator window. By delaying the data separator window and the data transition by known, predetermined amounts, a phase shift between the data transition and a particular data separator window in which it occurs can be determined. It is also an object of this invention that if the data transition does not occur within the delayed data separator window or the delayed data transition does not occur within the data separator window, the data transition will be dropped from the data stream and a data read error will have occurred.

16 Claims, 6 Drawing Sheets

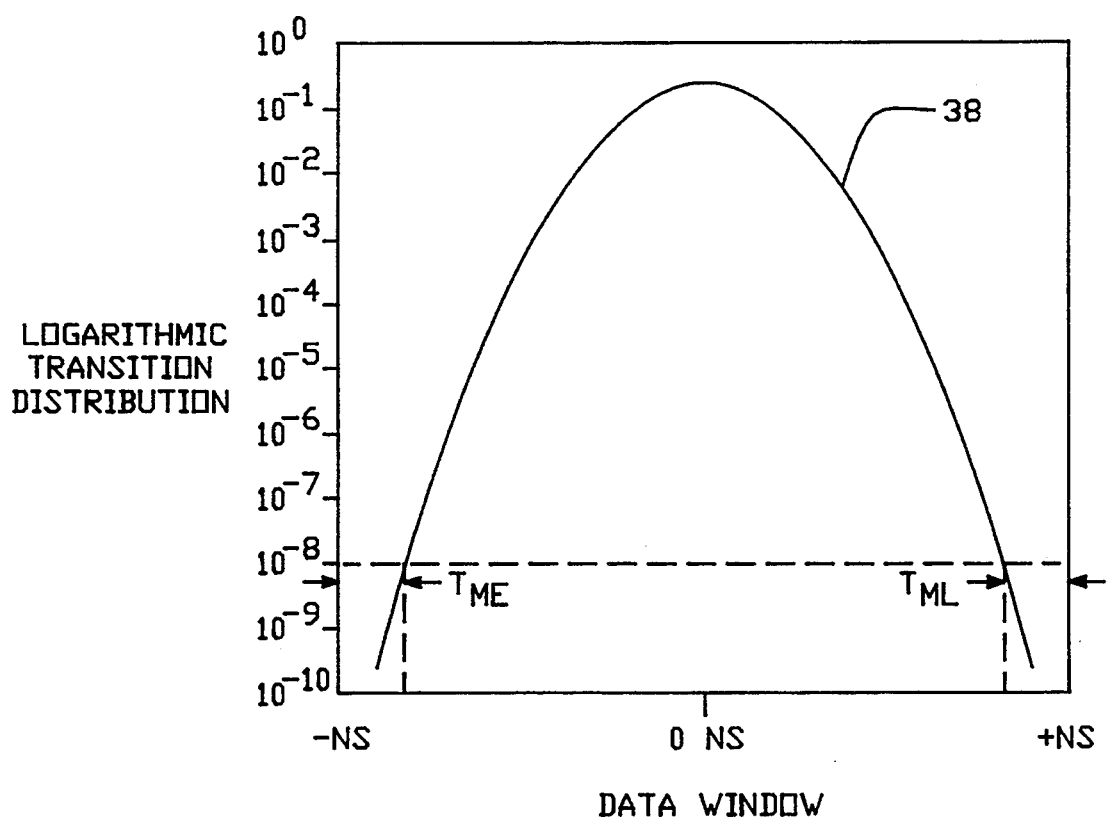
FIG.—3
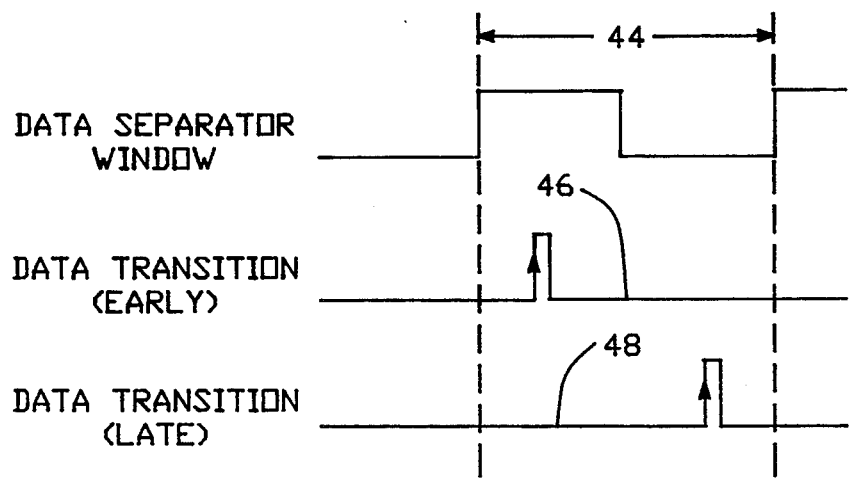
FIG.—5

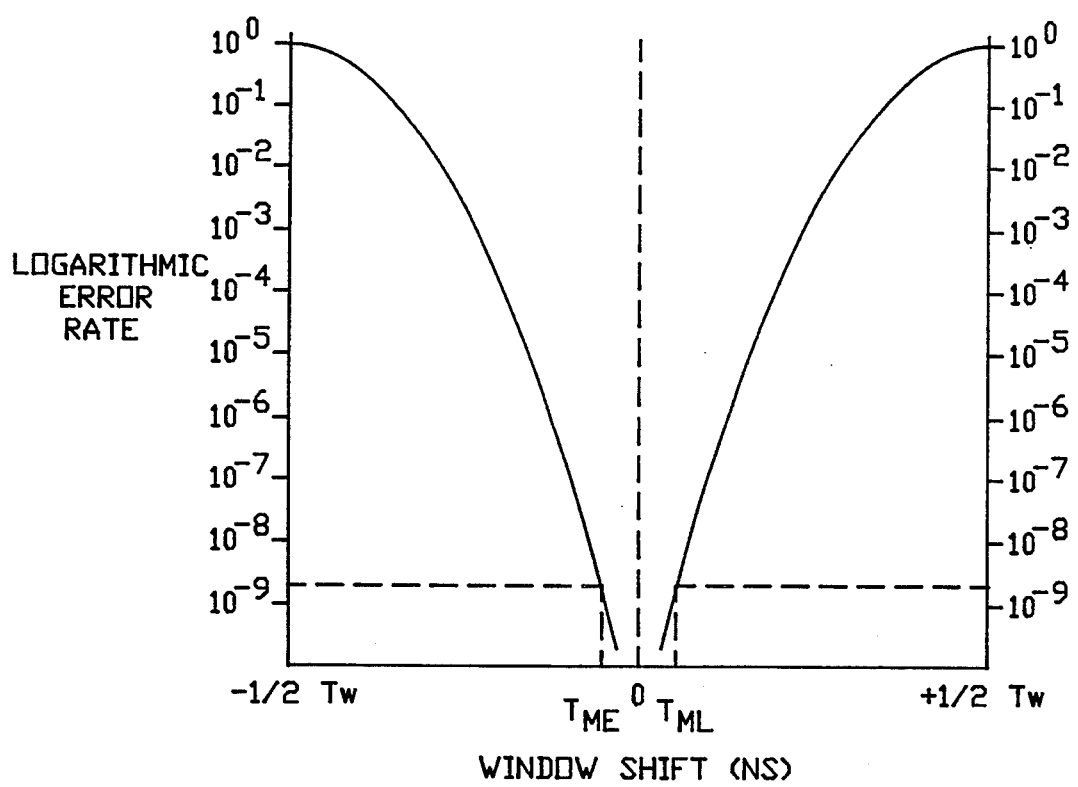
FIG.—4

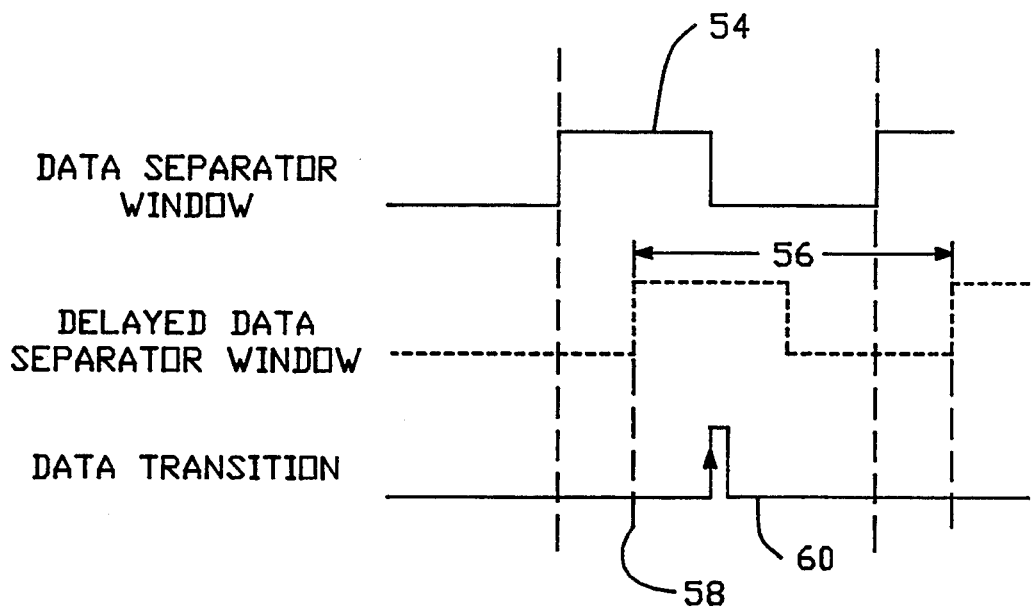
FIG.—6
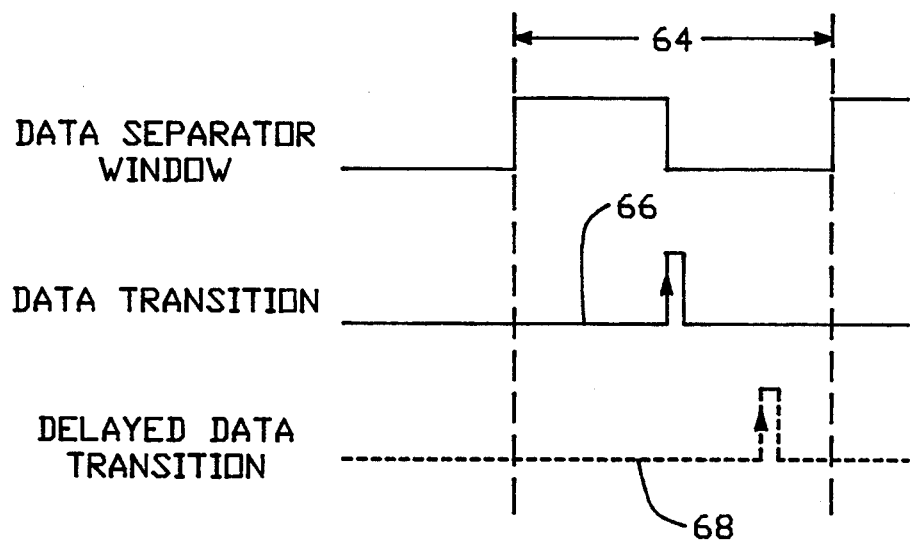
FIG.—7

CIRCUIT FOR DETERMINING WINDOW MARGIN FOR DATA TRANSITIONS IN A STREAMING DATA DEVICE

This invention relates to a method and apparatus for determining a phase shift between a clock signal period and a data signal transition in order to time efficiently determine the error rate of a mass storage device in a computer system.

BACKGROUND OF THE INVENTION

In a typical computer system there is generally some form of mass storage interconnected to the central processing unit (CPU). Mass storage devices, while being varied in number and form, are typically used to store data files and program data until their use is required by the CPU or alternatively are used for long term backup of a primary mass storage device. One example of a mass storage device is the hard disk drive which is most commonly used because of its extended storage capacity and its expedient data recall. When the operator requests the CPU to initiate program execution or when a program requires data not in memory, the CPU attempts to retrieve that data from the hard drive. The hard drive responds to that request by determining where the data is located on the disk, recalling that data, and then transferring it to the CPU. A second example of a mass storage device is the floppy or removable disk. This storage media is typically used for temporary or short term backup or to enable users to transport programs or data from one computer to another, but may be, and often is, the only mass storage device. Floppy disks provide the user greater flexibility as they are easier to transport than the hard drive which is usually integral to the computer system and is not easily removed for transportation. However, the floppy disk is limited by its storage capacity, which is usually much smaller than the hard disk, and is also limited by its speed as its read and write access time is significantly larger than that of a hard disk drive. A third example of a mass storage device is the streaming tape drive. These drives are used for high speed backup of portions of or an entire hard disk or even a series of hard disks. The advantage of the streaming tape drive is that because of its extended storage capacity, it enables backup with a minimum of operator interaction, and they may be transported more easily than hard disk drives for off-site from the primary computer system archival for protection. One additional storage device which should be noted is the optical disk drive. The optical disk is characterized by an extremely large storage capacity and also by its extremely fast data retrieval. However, it is limited in that the end user may only read from the disk and is unable to write to it. Thus, while being extremely useful for the purpose of data storage and look-up, it is limited in its range of applications as a data storage device.

For the above described devices, except for the optical disk, a write operation occurs when the CPU sends data and the data file to which the data should be written to the input/output controller for that particular device. As the media on a magnetic mass storage device generally is capable of assuming one of two states, it is those two states that define data in terms of logic 1 or a logic 0. However, state transitions on the magnetic media occur over the space domain of the media while data transitions within digital control circuitry occur over the time domain. There is then required a method of encoding a translation between the digital data within computer memory and actual flux transitions. Accordingly, there are several data formatting schemes which translate data bytes existing within the time domain into a series of state transitions within the space domain upon the storage media, yet retain the timing information for read back operations. Some examples of these formatting schemes are: FM, MFM, $M^2FM$, GCR, $RLL_{1,7}$ and $RLL_{2,7}$ all of which are well known in the prior art. These data formatting schemes are often inherent to the controller, and are generally predetermined based on a number of efficiency considerations which include minimizing the number of flux transitions while effectuating a sufficient number of flux transitions to effectively determine a clock signal for discerning data from the stream of state transitions. After the data has been formatted, the controller then directs the write head to effectuate the appropriate state transition upon the storage media. The state transitions on magnetic media are encoded when the device controller sends to a write circuit the encoded data and a write clock signal. The write circuit energizes a write head in accordance with the data to be written to effectuate the appropriate magnetic flux transitions upon the magnetic media.

Data reads from the magnetic media occur in effectively the reverse process used to write data. As the magnetic media passes by the read head of the storage device, flux transitions on the media are detected. The flux transitions generate an analog signal at the read head. It is thus necessary to convert the analog representations of the flux transitions into digital representations. This yields a series of pulses of a varying frequency. The pulses combine both clock and data information which relate directly to the formatting scheme used during the write operation. Thus, because a predetermined formatting scheme is used by the device controller to effect a write operation, the state transitions read from the magnetic media are decoded based upon both clock and data information contained within the pulses into the actual data byte which was sent to it by the CPU. Using techniques well known within the prior art, this formatted data is then separated into a timing signal or window in which data may be read, known as a data separator window, and also into data transitions. Circuitry then determines if a transition occurs within the data separator window. By determining where data transitions occur within a series of data separator windows, the initial data encoded by the device controller may be recovered. The controller then translates this encoded data back to the original non-encoded data which was sent to the controller by the CPU.

This invention is directed at measuring the occurrence of data transitions within the data separator window. Because transitions upon the magnetic media are decoded into a data separator window and possibly a data transition (if indeed there is one), it is imperative that the data transition fall within the proper data separator window to maintain the timing relationships within the data stream. Data transitions outside of their proper window will alter the recovered data from the original and lead to erroneous read backs.

In a number of systems, the data transition occurs ideally within the center of the data separator window. However, there are any number of factors which may cause a data transition to shift within the data separator window. Factors that contribute to a shift in the data transition within the data separator window include noise at the read and/or write heads, cross-talk from the read head, magnetic interaction between the flux transitions on a magnetic media, jitter within the phase lock loop circuitry, circuit component noise, and inherent component delay. The cumulative effect of the above factors contribute to the shift of the data transition within the data separator window. If the data transition shifts significantly, it is possible that it may move outside the boundary of the data separator window. It is the goal of device driver designers and manufacturers to quantify the probability of such an error, as it would yield a general indicator of the reliability of the device.

In order to obtain an accurate measure of the probability of a data transition falling outside of the data separator window, the error rates typically discussed are on the order of the number of data errors per $10^{10}$ data bits. In order to achieve a valid statistical analysis, it is not only necessary to determine the number of errors for every $10^{10}$ bits read, it is also necessary to repeat this test a sufficient number of times, approximately 10. The cumulative effect of having to generate an error rate per $10^{10}$ reads and have that error rate be statistically significant would require reading approximately $10^{11}$ data bits. The time required to test that number of bits effectively makes such a test preclusive for both system designers and system manufacturers. Thus, there is a need for a time efficient method and apparatus for obtaining statistically significant read error rates.

One time efficient method is to develop a measure of the allowable time interval between the leading and trailing edges of the data separator window and the data transitions for a given error rate, called the window margin. The window margin is a measure of the safety margin from the leading and trailing edges of the data separator window for a given error rate. These time margins effectively define a sub region of the data separator window into which the data transitions may fall to ensure that the stated error rate is achieved.

Window margin analysis is based on the known concept within the prior art that data transitions tend to occur substantially about a particular point within a data separator window, ideally the center of the data separator window. However, noise and other phenomena cause data transitions to occur on both sides of this center point. If a plot were developed representing where data transitions occur within the data separator window, a given distribution would result. This resulting distribution is integral to the development of the tests to determine the error rate of a mass storage device. If the shape of the distribution curve is known and the curve could be shifted to produce a given error rate located on the distribution curve, the location of the curve within the data separator window could be determined. Once that curve is determined, any number of error rates can be extrapolated based on the known location of the curve and also the known shape of the curve. This invention is ultimately directed at a circuit for determining if a shift of the data transitions within the data separator window has occurred.

There are several techniques for determining whether a shift relative to the center of the data separator window has occurred. One technique is called the compressed window method. This method is carried out by shifting both edges of the data separator window toward its center to artificially increase the data error rate. The PLL circuit receives the incoming data signal at the decoding stage of read back and generates a timing signal which is used to divide the data signal into segments. The PLL is effectively taken out of the circuit when the window is compressed so that the measured error rate is not a true reflection of the actual error rate of the entire device circuitry because the PLL has been significantly altered. A second method for measuring the shift within the data separator window is to measure the transition-to-transition arrival time. After a significant number of transitions have been read, the arrival times are input into a software PLL to construct a data separator window. The software then determines the position of the data transition within a data separator window. This method has a similar drawback to that of the first method in that it does not accurately measure the performance of the PLL. In fact, this method simulates the PLL and does not truly account for its performance in its measurements. A third method is called the sliding window technique. In order to effectuate this technique, over a series of data transitions, the data separator window is first shifted right or delayed in time, causing the leading edge to move toward the nominal center of the data separator window. The right shift is varied until a desired error rate occurs. Next, the data separator window is shifted left or advanced in time, causing the trailing edge of the window to move toward the center of the unshifted data separator window. The left shift also continues until the desired error rate is obtained. The major disadvantage of this method is that it is necessary to slide the data separator window in both directions. Thus, it is not possible to simultaneously test the window margins at both the leading and trailing edges of the data separator window, as it is first necessary to slide the window right or left in order to test one edge of the data separator window, then slide the data separator window in the opposite direction to increase the error rate at the other edge of the data separator window. This increases the test time by a factor of two and if it were desired to perform both shifts simultaneously, there would be a substantial increase the hardware requirement of the circuit.

SUMMARY OF THE INVENTION

This invention is directed to an improved method and circuit for determining the position of the data transition relative to the center of the data separator window. More particularly, this invention discloses a relatively simple circuit which delays the occurrence of the data transition relative to the data separator window for a predetermined time interval in order to determine if the data transition is late relative to the center of the data separator window. If the delayed data transition does not occur within the data separator window, the data transition is considered late. At the same time, the occurrence of the data separator window is delayed for a predetermined time interval in order to determine if the data transition has occurred early relative to the data separator window. If the data transition does not occur within the delayed data separator window, the data transition is considered early. Thus,,by using relatively simple circuitry, a shift of the data transition relative to the center of the data separator window can be determined, whether the shift is toward the leading edge of the data separator window (early) or toward the trailing edge of the data separator window (late). This circuit is advantageous for two reasons: first, because a shift of the data transition either left or right may be detected simultaneously, the time required to perform the window margin analysis may be greatly reduced over methods known in the prior art; and, second, there is no modification of the PLL performance so that it may be tested as a component of the overall read data circuit.

In a more particular sense, the disclosed circuit generates the appropriate error signals to indicate that the data transition has occurred early or late relative to the center of the data separation window. If the data separator window is delayed and the data transition does not occur within the delayed data separator window, an early error signal is generated to indicate that the data transition has occurred early within the data separator window. Conversely, if the data transition has been delayed and the delayed data transition does not occur within the data separator window, a late error signal is generated to indicate that the data transition has occurred late relative to the data separator window. In either of the above two cases, if an error is generated, the data transition is dropped from the data stream and a cyclic redundancy check error (CRC) is generated by the device controller. If after delays of both the data transition and the data separator window, the data transition has occurred within the data separator window, and it is determined that the data transition has occurred within the desired bounds of the data separator window and no error signal is generated. Furthermore, when this has occurred, the data transition is regenerated in the center of the data separator window and passed onto the device controller.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a graphical representation of a transition distribution plot showing the probability density of the location of any data transition occurring at any point within the data separator window;

FIG. 4 depicts a plot of window shift versus error rate;

FIG. 5 depicts typical phase variations between the data separator window and data transitions, indicating that the data transition may occur early or late relative to the center of the data separator window;

FIG. 6 depicts an example of the resulting waveforms when the occurrence of the data separator window is delayed according to one aspect of this invention;

FIG. 7 depicts an example of the resulting waveforms when the occurrence of the data transition is delayed relative to the data separator window according to another aspect of this invention;

DETAILED DESCRIPTION OF THE INVENTION

Figure 1:
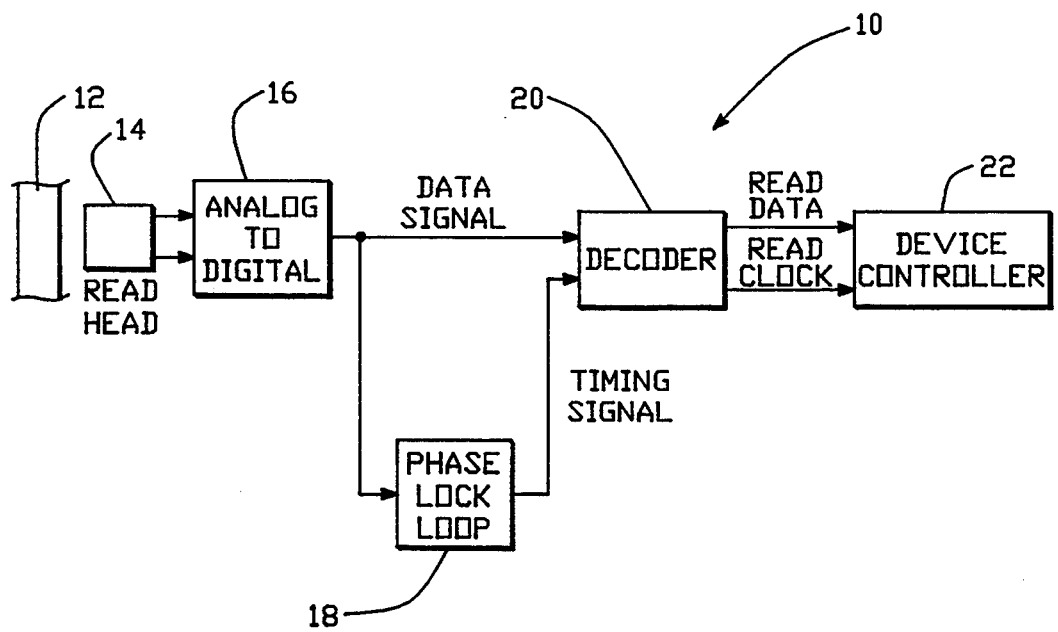
FIG. 1 is a block diagram of a typical circuit used to read data from a mass storage device.

The block diagram 10 of FIG. 1 is representative of a typical magnetic media mass storage device read circuit. Included in this device is storage media 12 upon which data to be retrieved is stored in the form of magnetic flux transitions. While the media shown in this embodiment generally is of the magnetic storage type it should be noted immediately that the invention disclosed herein is applicable to any type of read back data system where the data stored on the mass storage device is formatted to include both data and clock information imbedded in one data signal. As disclosed herein, the magnetic media may be a reel to reel tape, a tape cartridge, 3½ or 5¼ floppy disks, standard hard disk, or any type of magnetic media on which data is normally stored. As the media 12 moves past read head 14, flux transitions upon that media cause the read head to output a signal representative of those flux transitions. This signal is then input to analog-to-digital converter circuit (A/D) 16 where the analog signal flux transitions are therein converted into a digital data signal. The digital signal is typically a pulse train where logic level transitions represent magnetic flux transitions upon the media. The digital signal is then input to phase lock loop (PLL) circuit 18 which generates a timing cell based on the incoming data signal which is fed to decoder 20 along with the data signal emanating from A/D converter 16. The timing cell defines a data separator window, to be explained herein with respect to FIG. 2, that functions as a timing mechanism which combined with the data signal, enables decoder 20 to determine whether a transition within the data signal corresponds to a binary 1 or a binary 0 of data. As data written to the magnetic media is normally written according to one of several standard digital coding formats such as FM, MFM, and M$^2$FM, GCR, RLL$_{1,7}$ and RLL$_{2,7}$, decoder 20 translates the formatted data retrieved from the magnetic media to the actual data byte which is then passed to device controller 22 which returns the actual byte to the requesting device such as a CPU (not shown) or alternatively some other form of mass storage device.

Figure 2:
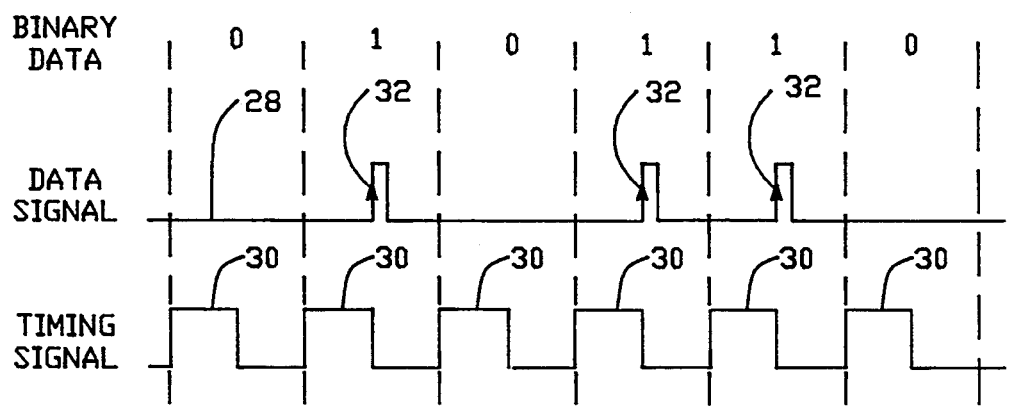
FIG. 2 depicts an example of the relationship between the data separator window, the data signal, and the encoded data which the data transitions represent.

FIG. 2 depicts example waveforms including a data signal and a series of timing cells defining individual data separator windows 30, which are typically input to decoder 20 of FIG. 1, where the data signal is the signal produced by A/D converter 16 and the timing cells are produced by the PLL circuit 18. As timing and data information is generally contained within the single data signal produced by analog to digital controller 16, it is necessary that PLL circuit 18 produce a timing cell in order to divide the data signal into data separator windows 30. Each data separator window 30 defines a time interval in which data transitions may or may not occur, and, depending upon the data coding format employed, an encoded number is assigned for that time interval spanned by a particular data separator window. In the embodiment, disclosed herein, logic 1 is assumed when there is a positive edge transition 32 substantially within the data window 30; all other transitions are assumed to be a logic 0. Thus, as depicted in FIG. 2, the occurrence of data transitions within the data separator windows 30 indicate whether the encoded data is a logic 1 or a logic 0. As represented herein, when a positive edge transition occurs as depicted at points 32, a logic 1 is assumed as the encoded data. Conversely, when no positive edge transition occurs within the data separator window, a logic 0 is assumed as the encoded data. Accordingly, data signal 28 of FIG. 2 represents encoded data 010110. Because transitions must occur within the data separator window, it is imperative that data signal 28 and the data separator windows 30 be substantially synchronized so that decoder 20 can distinguish whether the incoming data is a logic 1 or a logic 0. Should the data signal shift relative to the data separator window or vice versa, this important timing mechanism will be ineffective and erroneous data readback will occur.

Over a large number of data reads, of the order of $10^{10}$, a plot of the arrival time of the data transitions relative to the center of the data separator window typically will yield the plot as depicted in FIG. 3. The horizontal axis of FIG. 3 represents the position of the data transition relative to the center of the data separator window where 0ns represents the transitions occurring at the center of the window, −ns to the left of the center of the data separator window indicates a data transition prior to the center of the data separator window, and +ns to the right of the center of the data separator window indicates a data transition following the center of the data separator window. The vertical axis represents the logarithmic probability of a data transition occurring a given time distance before or after the center of the data separator window. Most of the data transitions will fall at the center of the data separator window. Towards the edge of the data separator window, there is a much lower probability that the data transitions will occur in that region. The probability density of a data transition falling within the data separator window is represented by distribution curve 38 depicted in FIG. 3. This distribution curve indicates that while the majority of data transitions occur substantially towards the center of the data separator window, some will occur toward the edges of the data separator window.

One measure of mass storage device with reliability upon which both system designers and manufacturers rely is a measurement of the leading and trailing portions of the data separation window in which no flux reversals are observed to occur for a specified number of bits. With reference to distribution curve 38 of FIG. 3, an error rate may be determined for a given window margin. For example, to determine an error rate for a leading edge window margin time Tme, the area under distribution curve 38 from negative infinity to Tme is calculated. This will yield the error rate for that given leading edge window margin time. Similarly, to determine an error rate for the window margin late Tml, it is necessary to calculate the area under distribution curve 38 in the region of Tml to infinity. If Tme and Tml are varied and the logarithmic window margin error rates are determined for each individual Tme and Tml, the resulting curve is depicted in FIG. 4. From this curve, it is possible to determine for a desired Tme or Tml the logarithmic error rate.

In an ideal system, a data transition will occur substantially at the center of the data separator window; however, a number of factors contribute to a phase change between the data separator window and the data transition. Factors that contribute to this phase shift include noise at the read/write head, cross talk from the read head, magnetic interaction between the flux transitions on the magnetic media, jitter within the PLL circuit, circuit component noise, and inherent component delay. These factors may individually or cumulatively effect the phase difference between the data transition and the data separator window. For the waveforms depicted in FIG. 5, when the data signal 46 is shifted to the left of the center of the data separator window 44, the data transition is said to occur early relative to the center of the data separator window. It is these phase changes between the data signal and the data separator window which generates the probability distribution function. Where data transition 48 is shifted to the right of the center of data separator window 44, the data transition is said to occur late relative to the center of the data separator window.

This invention determines if there has been a phase shift between the data separator window and the data transition of the data signal by delaying the occurrence of the data separator window to determine if the data transition has occurred early relative to the center of the data separator window while simultaneously the occurrence of the data transition is delayed relative to the occurrence of the data separator window. If after delaying the occurrence of the data transition, it is determined that the delayed data transition has occurred outside of the data separator window, the data transition is said to have occurred late relative to the center of the data separator window. Delaying the occurrence of the data separator window relative to the data transition and simultaneously delaying the occurrence of the data transition relative to the data separator window enables a determination whether the data transition has occurred early or late relative to the center of the data separator window. If in either of these cases it is determined that the data transition has occurred outside of the data separator window or outside of the shifted or delayed data separator window, the data transition is not passed beyond decoder 20 causing the controller to generate a cyclical redundancy error (CRC).

FIG. 6 depicts the waveforms that result when the circuit disclosed in this invention checks for an early data transition relative to the center of the data separator window. To determine if a data transition has occurred early, the data separator window 54 is delayed for a predetermined time interval to yield delayed data separator 56. The leading edge 58 of delayed data separator window 56 is compared by a timing comparator, to be discussed with respect to FIGS. 8 and 9, to the rising edge of the data transition 60. If leading edge 58 occurs before the rising edge of data transition 60, the data transition is said to occur within the data separator window. If the data transition 60 occurs before the leading edge 58 of the delayed data separator window 56, the data transition is said to occur early with respect to the data separator window 54, and a data transition early error has occurred.

FIG. 7 depicts representative waveforms used to determine if the data transition has shifted to the right within the data separator window 64. To determine if the data transition has shifted to the right of the data separator window, the data separator window remains fixed while the data transition is delayed for a predetermined time interval. Data separator window 64 remains fixed while data transition 66 is delayed to produce delayed data transition 68. In this embodiment, because it is the rising edge of data transition signal which indicates that a data transition has occurred, if the rising edge of the delayed data transition 68 occurs within the bounds of the data separator window 64, no data transition late error has occurred. Conversely, if the delayed data transition occurs outside of the delay data separator window 64, it is determined that the data transition 66 has occurred late relative to the center of the data separator window.

For determining early or late occurrences, because the duration of the data separator window is known and the delayed data separator window and the delayed data transition delay times are predetermined and known, if no data early or data transition late error has occurred, the data transition has occurred within the data separator window and also within a sub window defined by the data separator window minus the predetermined time intervals for each delay period. Thus, this circuit effectively determines how close the data transitions occur to the edges of the data separator window. The significance of this operation is that by controlling the delay period of the data separator window and the delay data transition, the error rate of the drive may be artificially increased. The increased error rate allows the drive to be tested in an expedited fashion because by locating a minimal number of points, the remaining curve may be extrapolated from those few data points. More particularly, when the characteristics of a drive is known, modifications to that drive and effect any error rate may be measured quickly because the gaussian distribution is well known.

Figure 8:
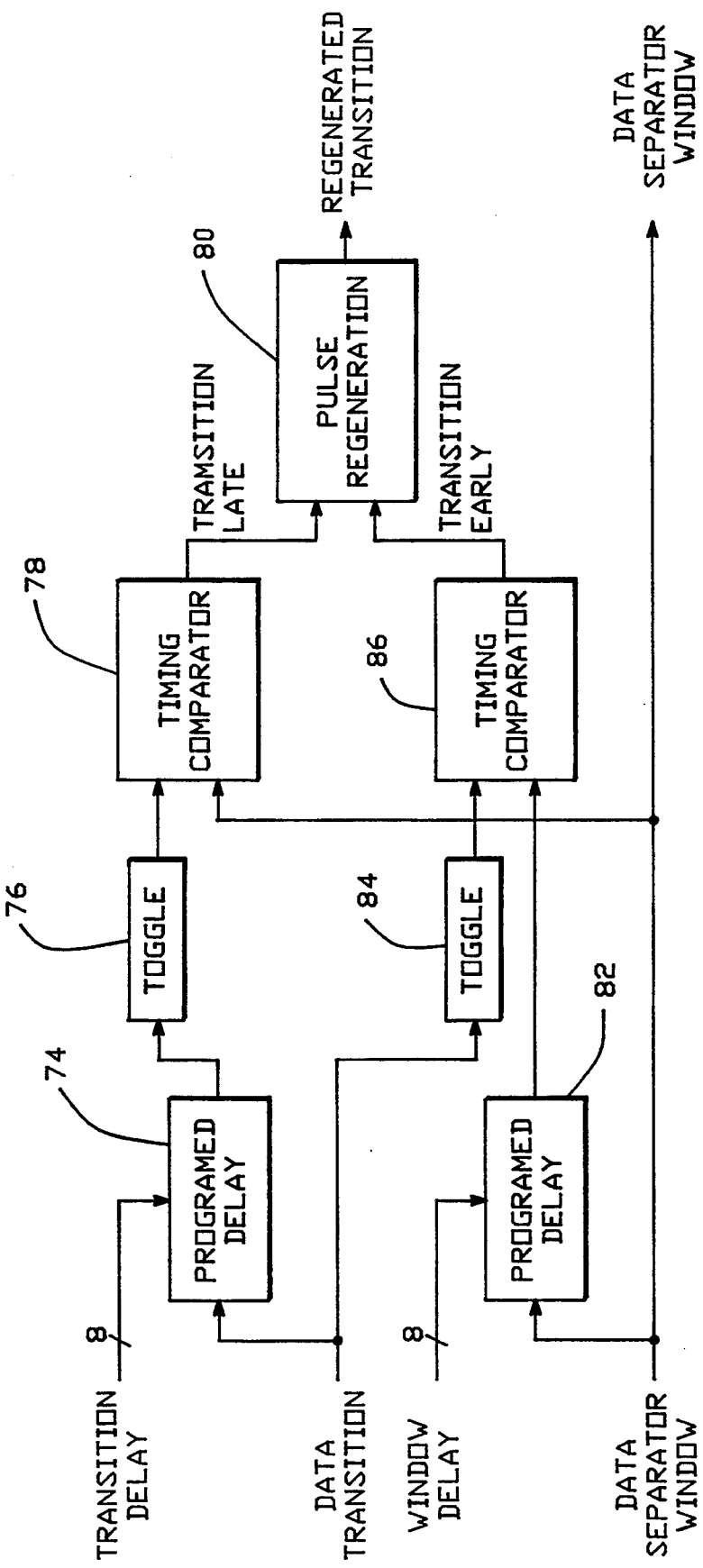
FIG. 8 is a block diagram of the apparatus used to determine a shift of the data transition relative to the center of the data separator window.

Referring to FIG. 8, a block diagram of the window margining circuit is depicted. Into programmed delay element 74 is input the data transition and also a data transition delay byte which is indicative of the desired predetermined time interval to delay the data transition. The output from program delay element 74 activates toggle element 76 which indicates to timing comparator 78 that a delayed data transition has occurred. Also input to the timing comparator 78 is a data separator window which is compared to the output from toggle element 74 to determine whether the data separator window leading edge or the data transition leading edge has occurred first. Program delay element 74, toggle element 76, and timing comparator 78 effectuate the waveforms depicted in FIG. 7. The output of timing comparator 78 will indicate whether the data transition has occurred within the data separator window or outside of the data separator window. For example, the output of timing comparator 78 will assume logic 1 to indicate that the data transition was within the data separator window and assume logic 0 to indicate that the data transition was not within the data separator window. This signal is then fed to the pulse regeneration circuit 80 which regenerates the data pulse if no errors, early or late, have occurred.

Similarly, the data separator window is input to programmed delay element 82 as is a data separator window delay byte which is indicative of the desired predetermined time interval to delay the data separator window. The output from program delay element 82 is input into timing comparator, as is the output from toggle element 84 which indicates whether a data transition has occurred. Toggle element 84 functions as described above with respect to toggle element 74 except that it is triggered on the data transition, not the delayed data transition. Program delay element 82, toggle element 84, and timing comparator 86 effectuate the function depicted in FIG. 6, and indicate whether a data transition has occurred early within the data separator window. If a data transition has occurred early within the data separator window, an error is output by timing comparator 86. The output from timing comparator 86 assumes logic states similarly described with respect to timing comparator 78. The error signal from timing comparator 86 is also input to pulse regeneration circuit 80.

If the data transition has arrived within the delayed data separator window and a delayed data transition has arrived within the data separator window, no error has occurred, and the pulse regeneration circuit 80 regenerates the input pulse at the center of the data separator window which is also output by the window margin circuit. If the data transition has not arrived within the data separator window, whether the data transition was early or late, pulse regeneration circuit 80 does not regenerate the data transition. Typically, when the data transition is not regenerated, a cyclic redundancy check (CRC) is generated by the device control. This indicates that an error has occurred in reading the data from the magnetic media of the storage device.

Figure 9:
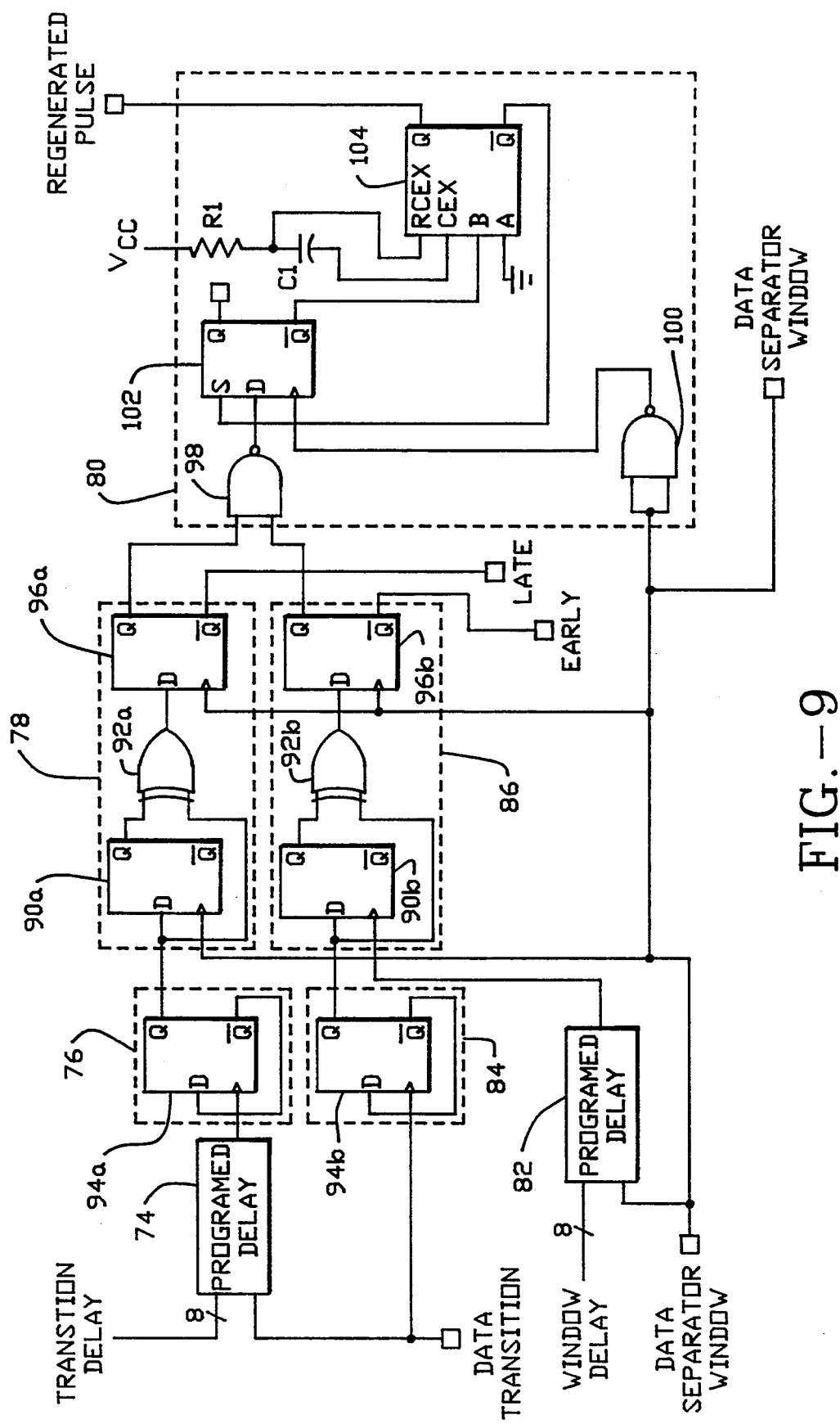
FIG. 9 is a circuit diagram of the block diagram of FIG. 8 that determines whether there has been a shift of the data transition relative to the center of the data separator window.

FIG. 9 is a circuit diagram of the block diagram described with respect to FIG. 8. The inputs to this circuit are as described with respect to FIG. 8 and include a data transition, a data separator window, and two eight bit delay bytes which determine the predetermined delay for the data transition and the data separator window, respectively. Programmed delay elements 74 and 76 are as described with respect to FIG. 8. It should also be noted that with respect to the circuit diagram of FIG. 9, all biasing and grounding connections of the integrated circuit elements have been omitted for the purposes of clarity, but are those used within the prior art. At the start of every data separator window, the rising edge of the data separator window clocks the input D of delay flip-flop 90a through to its normal output Q. As the input D and the normal output Q to delay flip-flop 90a will be identical the output of exclusive-OR gate 92a will be low. The data separator window is also input to programmed delay element 76 which delays the data separator window by a predetermined amount corresponding to the value of the window delay byte labeled window delay. The output of programmed delay element 76 which is a delay data separator window clocks the input D of delay flip-flop 90b through to its normal output Q. Because the input D and the normal output Q of delay flip-flop 90b will be identical, the output of exclusive-OR gate 92b will be low.

The data transition is input into program delay element 74 which delays the occurrence of that data transition by a predetermined amount corresponding to the value of the eight bit delay byte labeled transition delay. The positive edge of the delayed data transition clocks the input D of delay flip-flop 94a through to its normal output Q. Because the complemented output Q is fed back into the input D of delay flip-flop 94a, there is in effect a toggle at the normal output Q of delay flip-flop 94a upon every rising edge pulse out of programmed delay element 74. Thus, upon the occurrence of a rising edge of a delayed data transition, the normal output Q of delay flip-flop 94a will toggle between logic 0 and logic 1. Upon toggling the output of delay flip-flop 94a, the output of exclusive-OR gate 92a will rise to a logic 1 as the normal output Q of delay flip-flop 90a and the normal output Q of delay flip flop 94a are complements, causing the output of exclusive-OR gate 92a to rise to logic 1. Similarly, the rising undelayed data transition triggers delay flip-flop 94b which functions as described above with respect to delay flip-flop 94a. Upon the toggling of the normal output Q of delay flip-flop 94b the output of exclusive-OR gate 92b will rise to logic 1.

At the end of each data separator window (at the beginning of the next data separator window), the outputs of exclusive-OR gates 92a and 92b are clocked by the rising edge of the next data separator window to the normal outputs of delay flip-flops 96a and 96b, respectively. In this particular embodiment, if at the end of the data separator window, the output of one of exclusive-OR gates 92a or 92b is low, the data transition has occurred either too early or too late relative to the predetermined time intervals used to shift either the data transition or the data separator window.

The states of exclusive-OR gates 92a and 92b are clocked respectively into delay flip-flops 96a and 96b at the end of each data separator window as described above. If the normal outputs Q from delay flip-flops 96a and 96b are both high, the output of NAND gate 98 will be logic 0. If the input from NAND gate 98 is low, indicating that the data transition was neither early nor late, the data pulse will be regenerated in the center of the next data separator window. NAND gate 100 inverts the data separator window signal so that a negative edge is inverted to a positive edge. This negative edge represents the center of the data separator window. Upon the negative edge transition of the data separator window, delay flip-flop 102 clocks the output from NAND gate 98 through to the complemented output Q of delay flip-flop 102. Because the input into delay flip-flop 102 is a logic 0 if no error has occurred, the complemented output Q of delay flip-flop 102 will be a logic 1 and triggers pulse generator 104.

Pulse generator 104 is embodied herein as a monostable multivibrator that triggers upon a positive edge transition at input B causing a positive going pulse at the normal output Q. Pulse regeneration occurs when the complemented output Q of delay flip-flop 102 rises to logic 1. The duration of the pulse is determined according to the values of R1 and C1 which may be varied to change the pulse duration. Furthermore, the complemented output Q of pulse generator 104 is input to the set input of delay flip-flop 102 so that when pulse generator 104 is triggered, the complemented output Q drops to logic 0 and sets delay flip-flop 102. Delay flip-flop 102 when set prevents the additional generation of pulses until a no error condition has been determined for the next data separator window. The circuit has thus determined whether there has been a shift of the data transition within the data separator window with a minimum of alteration to the PLL signal and a minimum addition to the test duration.

While the above description constitutes the preferred embodiments of the present invention, it will be appreciated that the invention is susceptible to modification, variation, and change without departing from the proper scope and fair meaning of the accompanying claims.

I claim:

1. In a digital mass storage device of a medium from which digital data is retrieved, and data retrieval occurs by decoding one of a number of states which said medium assumes and said states are decoded by examining for transitions of a data signal defined as data transitions occurring within a predetermined time interval defined as a data separator window and said data transition occurs within said data separator window, a window margin circuit for determining a shift of said data transition relative to the center of said data separator window comprising:

means for delaying the occurrence of said data separator window for a first predetermined interval to define a delayed data separator window;

means for delaying the occurrence of said data transition for a second predetermined interval to define a delayed data transition;

means for determining if said data transition occurs within said delayed data separator windows where a data transition not occurring within said delayed data separator window indicates that said data transition occurs early relative to the center of the data separator window; and means for determining if said delayed data transition occurs within said data separator window where a delayed data transition not occurring within said data separator window indicates that said data transition occurs late relative to the center of the data separator window.

2. The circuit according to claim 1 wherein a late window signal is generated if said delayed data transition occurs outside of said data separator window, and an early window signal is generated if said data transition occurs outside of said delayed data separator window.

3. The circuit according to claim 2 wherein said circuit includes a means for regenerating said data transition and said data separator window with said data transition occurring substantially within the center of said data separator window if no early window and no late window signals are generated.

4. The circuit according to claim 2 wherein said circuit includes a means for regenerating said data separator window and suppressing said data transition if a window early signal is generated.

5. The circuit according to claim 2 wherein said circuit includes a means for regenerating said data separator window and suppressing said data transition if a window late signal is generated.

6. The circuit according to claim 1 wherein:

said data separator window delay interval is programmable so that said delayed data separator window is varied; and said data transition delay interval is programmable so that said delayed data transition is varied.

7. The circuit according to claim 6 wherein the data separator window delay interval and the data transition delay interval are progressively increased in order to determine a relative position of said data transition within said data separator window.

8. The circuit according to claim 1 wherein said circuit includes:

a first programmable delay element for delaying the occurrence of said data transition relative to said data separator window;

a second programmable delay element for delaying the occurrence of said data separator window;

a first toggle element including an output that assumes one of two first alternate states and an input comprising the delayed data transition wherein the occurrence of a delayed data transition causes the output of said first toggle element to assume a first alternate state;

a second toggle element including an output that assumes one of two second alternate states and an input comprising the data transition wherein the occurrence of a data transition causes the output of said second toggle element to assume a second alternate state;

a first timing comparator including an output that is high if the delayed data transition occurs before the trailing edge of said data separator window and an output that is low if the data transition occurs after the trailing edge of said data separator window where a output low indicates a transition early error;

a second timing comparator including an output that is high if the data transition occurs before the trailing edge of said delayed data separator window and an output that is low if the data transition occurs after the leading edge of said data separator window where an output high indicates a transition late error; and a pulse regeneration means for regenerating the occurrence of said data transition substantially within the data separator window when said first timing comparator output is high and said second timing comparator output is high.

9. In a digital mass storage device of a medium from which digital data is retrieved, and data retrieval occurs by decoding one of a number of states which said medium assumes and said states are decoded by examining for transitions of a data signal defined as data transitions occurring within a predetermined time interval defined as a data separator window and said data transition occurs within said data separator window, a method for determining a shift of said data transition relative to the center of said data separator window which comprises the steps of:

delaying the occurrence of said data separator window for a first predetermined interval to define a delayed data separator window;

delaying the occurrence of said data transition for a second predetermined interval to define a delayed data transition;

determining if said data transition occurs within said delayed data separator window where a data transition not occurring within said delayed data separator window indicates that said data transition occurs early relative to the center of the data separator window; and determining if said delayed data transition occurs within said data separator window where a delayed data transition not occurring within said data separator window indicates that said data transition occurs late relative to the center of the data separator window.

10. The method according to claim 9 which further comprises the steps of generating a late window signal if said delayed data transition occurs outside of said data separator window, and generating an early window signal if said data transition occurs outside of said delayed data separator window.

11. The method according to claim 10 which further comprises the steps of regenerating said data transition and said data separator window with said data transition occurring substantially within the center of said data separator window if no early window and no late window signals are generated.

12. The method according to claim 10 which further comprises the steps of regenerating said data separator window and suppressing said data transition if a window early signal is generated.

13. The method according to claim 10 which further comprises the steps of regenerating said data separator window and suppressing said data transition if a window late signal is generated.

14. The method according to claim 9 wherein:

said step of delaying said data separator window is carried out with a first programmable delay element so that said delayed data separator window is varied; and said step of delaying said data transition is carried out with a second programmable delay element so that said delayed data transition is varied.

15. The method according to claim 14 which further comprises the steps of progressively increasing the data separator window delay interval and the data transition delay interval in order to determine a relative position of said data transition within said data separator window.

16. The method according to claim 9 wherein:

said step of delaying said data separator window is carried out with a first programmable delay element for delaying the occurrence of said data transition relative to said data separator window;

said step of delaying said data transition is carried out with a second programmable delay element for delaying the occurrence of said data separator window;

said step of determining if said data transition occurs within said data separator window is carried out with a first toggle element including an output that assumes one of two first alternate states and an input comprising the delayed data transition wherein the occurrence of a delayed data transition causes the output of said first toggle element to assume a first alternate state;

said step of determining if said delayed data transition occurs within said data separator window is carried out with a second toggle element including an output that assumes one of two second alternate states and an input comprising the data transition wherein the occurrence of a data transition causes the output of said second toggle element to assume a second alternate state;

said step of determining if said data transition occurs within said data separator window is further carried out with a first timing comparator including an output that is high if the delayed data transition occurs before the trailing edge of said data separator window and an output that is low if the data transition occurs after the trailing edge of said data separator window where a output low indicates a transition early error;

said step of determining if said delayed data transition occurs within said data separator window is further carried out with a second timing comparator including an output that is high if the data transition occurs before the trailing edge of said delayed data separator window and an output that is low if the data transition occurs after the leading edge of said data separator window where an output high indicates a transition late error; and said step of determining a shift of said data transition relative to the center of said data separator further includes the step of regenerating the occurrence of said data transition substantially within the data separator window when said first timing comparator output is high and said second timing comparator output is high.

* * * * *